J. TRAGESER.
Steam Coil.
No. 21,284.
Patented Aug. 24, 1858.
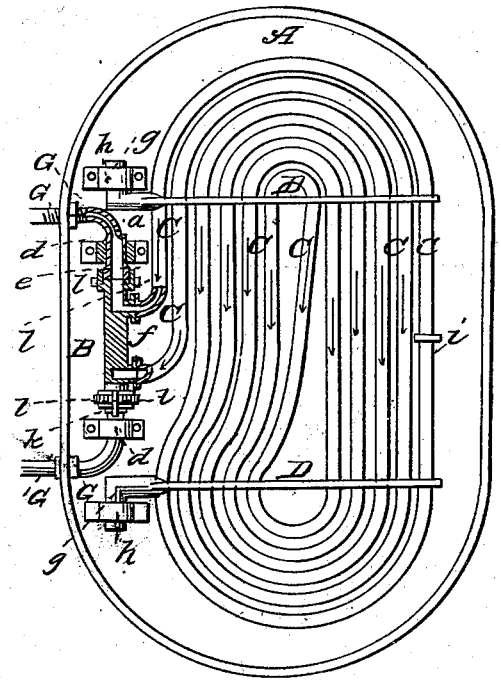

UNITED STATES PATENT OFFICE.

JOHN TRAGESER, OF NEW YORK, N. Y.

IMPROVEMENT IN APPARATUS ATTACHED TO STEAM-COILS IN VATS.

Specification forming part of Letters Patent No. 21,284, dated August 21, 1858.

*To all whom it may concern:*

Be it known that I, JOHN TRAGESER, of the city, county, and State of New York, have invented a new and useful Improvement in Steam-Coils for Brewers' Boiling-Tubs and other Vessels for Boiling or Heating Liquids; and I do hereby declare that the following is a full, clear, and exact description of the same, reference being had to the accompanying drawings, in which—

Figure 1 is a transverse vertical section of a brewer's tub with my improved arrangement of boiling-pipes. Fig. 2 is a plan of the same.

Similar letters of reference denote the same parts in both figures.

To enable others skilled in the art to make and use my invention, I will proceed to describe its construction and operation.

A is the tub. $a$ is the pipe which connects with the steam-boiler, and $b$ is the escape-pipe, both passing through one side of the tub, and secured thereto by nuts $c\,c$, inside and outside, with washers or gaskets, to make tight joints. Portions of these two pipes within the tub are arranged exactly in line with each other as close as practicable to the side of the tub, and are supported near the extremities in bearers $d\,d$, which rest upon and are secured to the bottom of the tub.

B is a cylinder or shaft, solid or closed at the middle portion of its length, but hollow at its ends, which are provided with flanges, and are fitted with ground joints between the ends of the pipes $a\,b$, to which said cylinder or shaft is secured by couplings $e\,e$, which are fitted over its flanges and screwed onto the ends of the pipes $a\,b$, but which allow the cylinder or shaft to turn freely between said pipes.

C is the coil of pipe. When the coil swings on its journals $g\,g$, the cylinder or shaft B turns with it, but not the couplings $e\,e$, which are kept stationary and tight upon the pipes $a\,b$ by ratchets $l\,l$ on their peripheries and spring-pawls $j\,j$, attached to lugs $k\,k$, which are fastened to the pipes $a\,b$. These ratchets and pawls permit the tightening up of the couplings, but prevent them working loose by the frequent turning of the cylinder or shaft B in raising and lowering the coil.

The pipes $a\,b$ may, if desirable, pass through and be attached to the bottom instead of to the sides of the vessel.

I do not claim arranging steam-coils on shafts or journals to swing to a vertical position for the purpose of cleaning out the vessels in which they are placed; but

What I claim as my invention, and desire to secure by Letters Patent, is—

Providing ratchets $l\,l$ on the peripheries of the couplings, and pawls $j\,j$, attached to the stationary supply and escape pipes $a\,b$, to prevent the working loose of the coupled joints by the swinging of the coil.

JOHN TRAGESER.

Witnesses:
   MICH. HUGHES,
   S. F. COHEN.